US012725451B2

(12) United States Patent
Ding et al.

(10) Patent No.: US 12,725,451 B2
(45) Date of Patent: Sep. 1, 2026

(54) ARTIFICIAL INTELLIGENCE VIDEO ANALYSIS ENHANCED WITH TEXT GENERATION

(71) Applicant: International Business Machines Corporation, Armonk, NY (US)

(72) Inventors: Yuan Yuan Ding, Shanghai (CN); Tong Liu, Xi'an (CN); Li Juan Gao, Xi'an (CN); Zhong Fang Yuan, Xi'an (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 252 days.

(21) Appl. No.: 18/583,433

(22) Filed: Feb. 21, 2024

(65) Prior Publication Data

US 2026/0017984 A1 Jan. 15, 2026

(51) Int. Cl.
*G06V 40/20* (2022.01)

(52) U.S. Cl.
CPC .................................... *G06V 40/20* (2022.01)

(58) Field of Classification Search
CPC ...................................................... G06V 40/20
See application file for complete search history.

(56) References Cited

U.S. PATENT DOCUMENTS 11,106,715 B1 * 8/2021 Ju ........................ G06N 3/0895
2020/0349966 A1 * 11/2020 Konzelmann .......... G06V 40/20
2021/0081497 A1 * 3/2021 Qin ....................... G06F 40/295
2021/0192194 A1 6/2021 Chi et al.

(Continued)

FOREIGN PATENT DOCUMENTS

CN 103823824 A 5/2014
CN 108830252 A 11/2018

(Continued)

OTHER PUBLICATIONS

Sharma et al., "Semantic Mechanical Search with Large Vision and Language Models", 7th Conference on Robot Learning, arXiv:2302.12915v2, Oct. 30, 2023, 37 pages.

(Continued)

*Primary Examiner* — Pinalben Patel

(74) *Attorney, Agent, or Firm* — Amin, Turocy & Watson, LLP

(57) ABSTRACT

Systems and techniques that facilitate video behavior recognition and prediction based on a generative language model are provided. One or more embodiments described herein can comprise a system, which can comprise a processor set, a set of one or more computer-readable storage media, and program instructions collectively stored in the set of one or more computer-readable storage media. The program instructions can cause the processor set to input a video to a first machine learning model to produce text data that describes the video, input the text data into a second machine learning model to produce a first set of predictions regarding one or more agents depicted in the video, input the first set of predictions into an embedding layer to produce embeddings, and input the embeddings and the video into a third machine learning model to produce a second set of predictions regarding the one or more agents.

20 Claims, 10 Drawing Sheets

(56) References Cited

U.S. PATENT DOCUMENTS

| | | | | |
|---|---|---|---|---|
| 2025/0199510 | A1* | 6/2025 | Grigore | G06N 3/0455 |

FOREIGN PATENT DOCUMENTS

| | | | |
|---|---|---|---|
| CN | 112560668 | A | 3/2021 |
| CN | 115798046 | A | 3/2023 |

OTHER PUBLICATIONS

Saxena, et al. "Human Behaviour Recognition using Fuzzy System in Videos" International Journal on Recent and Innovation Trends in Computing and Communication, vol. 11, Issue 5s, 2023, 8 pages.

Felsen, Panna "Learning to Predict Human Behavior from Video" Electrical Engineering and Computer Sciences University of California at Berkeley, May 17, 2019, 71 pages.

* cited by examiner

ARTIFICIAL INTELLIGENCE VIDEO ANALYSIS ENHANCED WITH TEXT GENERATION

BACKGROUND

The subject disclosure relates to video behavior recognition and prediction, and more specifically, to video behavior recognition and prediction based on a generative language model. The subject disclosure relates to machine learning and artificial intelligence video analysis.

Video-based behavior recognition and prediction comprises identifying and predicting behaviors of one or more agents in a video according to video content, thereby improving understanding of human behavior for numerous practical applications, such as intelligent monitoring or human-computer interaction. However, video-based behavior recognition and prediction rely on visual techniques to analyze videos that are affected by the conditions or variability of the videos. That is, environmental conditions, lighting conditions, noise, or other factors of a video affect the success of the artificial intelligence.

The above-described background description is merely intended to provide a contextual overview regarding video-based behavior recognition and prediction and is not intended to be exhaustive.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate video behavior recognition and prediction based on a generative language model are provided.

According to an embodiment, a computer-implemented method comprises inputting, by a device operatively coupled to a processor, a video to a first machine learning model to produce text data that describes the video. The computer-implemented method further comprises inputting, by the device, the text data into a second machine learning model to produce a first set of predictions regarding one or more agents depicted in the video. The computer-implemented method further comprises inputting, by the device, the first set of predictions into an embedding layer to produce embeddings. The computer-implemented method further comprises inputting, by the device, the embeddings and the video into a third machine learning model to produce a second set of predictions regarding the one or more agents.

According to another embodiment, a system comprises a processor set that executes program instructions stored in a computer readable storage medium. The program instructions cause the processor set to input a video to a first machine learning model to produce text data that describes the video. The program instructions further cause the processor set to input the text data into a second machine learning model to produce a first set of predictions regarding one or more agents depicted in the video. The program instructions further cause the processor set to input the first set of predictions into an embedding layer to produce embeddings. The program instructions further cause the processor set to input the embeddings and the video into a third machine learning model to produce a second set of predictions regarding the one or more agents.

According to another embodiment, a computer program product includes a computer readable storage medium having program instructions embodied therewith. The program instructions are executable by a processor to cause the processor to input a video to a first machine learning model to produce text data that describes the video. The program instructions are further executable to cause the processor to input the text data into a second machine learning model to produce a first set of predictions regarding one or more agents depicted in the video. The program instructions are further executable to cause the processor to input the first set of predictions into an embedding layer to produce embeddings. The program instructions are further executable to cause the processor to input the embeddings and the video into a third machine learning model to produce a second set of predictions regarding the one or more agents.

DETAILED DESCRIPTION

Figure 1:
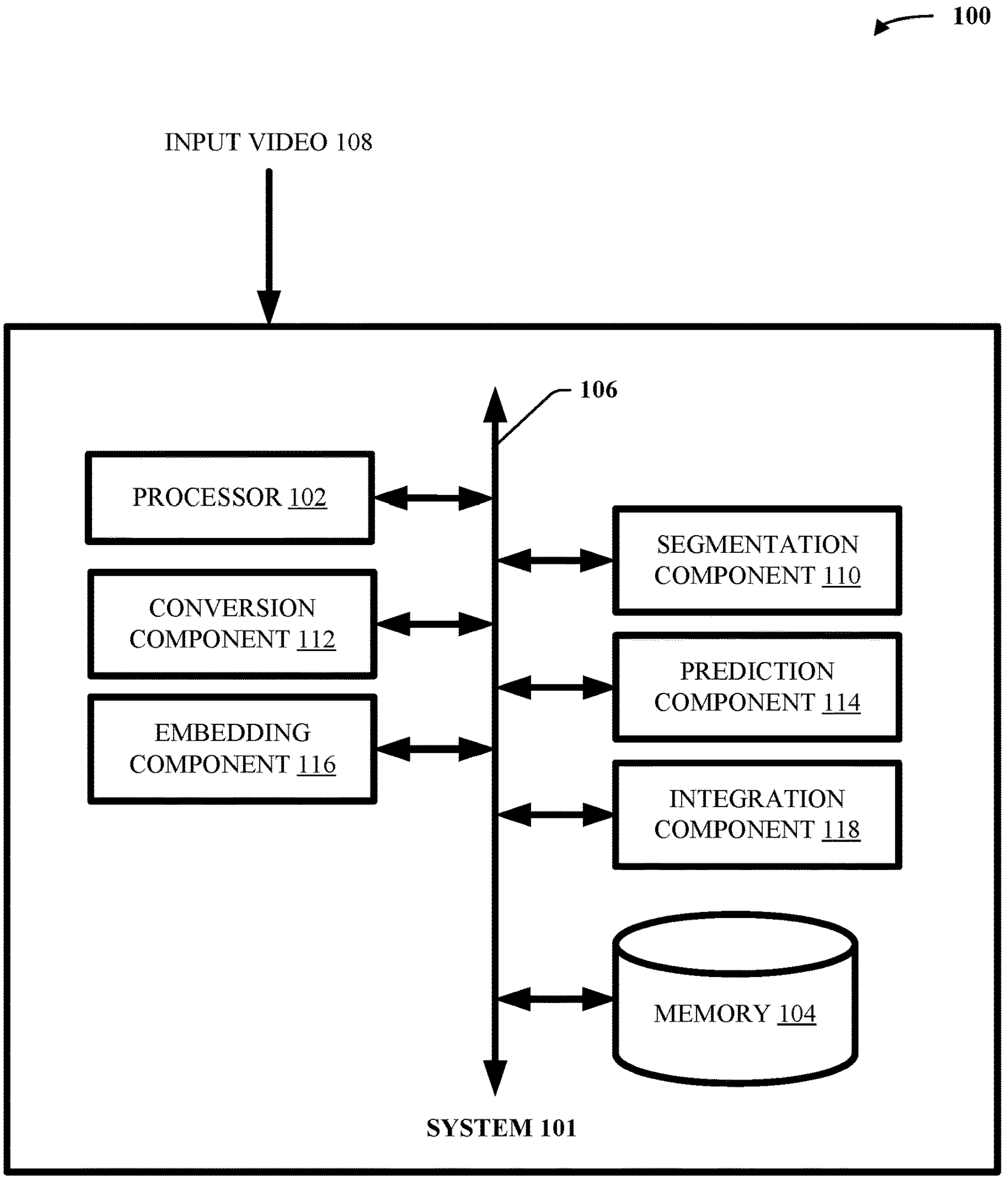
FIG. 1 illustrates a block diagram of an example, non-limiting system that can facilitate video behavior recognition and prediction based on a generative language model, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

According to an embodiment, a computer-implemented method comprises inputting a video to a first machine learning model to produce text data that describes the video. The computer-implemented method further comprises inputting the text data into a second machine learning model to produce a first set of predictions regarding one or more agents depicted in the video. The computer-implemented method further comprises inputting the first set of predictions into an embedding layer to produce embeddings. The computer-implemented method further comprises inputting the embeddings and the video into a third machine learning model to produce a second set of predictions regarding the one or more agents. An advantage of this method includes improving a machine learning model's accuracy of outputted predictions regarding one or more agents of a video.

In one or more embodiments of the aforementioned computer-implemented method, the third machine learning model weights the embeddings against at least one of spatial features and temporal features generated via inputting the video into the third machine learning model. An advantage of this approach is that it enables a machine learning model to capture relationships between semantic, spatial, and temporal features to enhance prediction accuracy.

In some embodiments of the aforementioned computer-implemented method, at least one of the first set of predictions or the second set of predictions includes a respective confidence level. An advantage of this implementation is that it enables a machine learning model to produce and provide a more accurate set of predictions.

In an embodiment of the aforementioned computer-implemented method, the first machine learning model comprises a generative language model, where the video is input into the generative language model as individual frames of the video, and the text data is generated per frame. An advantage of this approach is that prediction accuracy of a machine learning model is enhanced by mitigating effects of visual inconsistencies of a video through extracting text data by frame.

In one or more embodiments of the aforementioned computer-implemented method, the computer-implemented method further comprises reformulating the text data into a prompt via inputting the text data into a fourth machine learning model, in response, receiving the prompt as output from the fourth machine learning model, where the text data is input as the prompt into the second machine learning model. An advantage of this method includes improving efficiency of a machine learning model to generate predictions.

In an embodiment of the aforementioned computer-implemented method, data from a data lake is input into the fourth machine learning model so that the prompt includes supplemental information. An advantage of this approach is that it enables a machine learning model to produce more accurate predictions by receiving a more contextually accurate and relevant prompt.

In some embodiments of the aforementioned computer-implemented method, the third machine learning model performs a feature fusion of the embeddings. This feature has the technical effect of enabling a machine learning model to generate more accurate predictions by combining embeddings generated from multiple samples/frames.

According to some embodiments, the above-described computer-implemented method can be implemented as a computer system or as a computer program product.

Video-based behavior recognition and prediction involves analyzing and identifying human or object behavior from video data, typically using machine learning and/or computer vision techniques. Such methods aim to automatically recognize patterns, actions, and/or interactions within a sequence of video frames and, in some cases, predict future behaviors based on the observed patterns. Video-based behavior recognition and prediction can have extensive application in various fields or areas (e.g., prevention or detection of unlawful activities, emergency response, industrial safety or productivity, traffic monitoring, medical or nursing applications). Video-based behavior identification and prediction of abnormal behavior can help identify potential risks and anomalies in advance, improve safety, reduce losses, and improve quality of life in various areas. For example, video-based behavior recognition and prediction can be utilized to identify unusual behavior patterns in security videos (e.g., burglary, intrusion) to prevent potential unlawful activities early.

One or more embodiments described herein enhances video-based behavior recognition and prediction by mitigating effects of video complexities (e.g., noise, drastic lighting changes, background interference) on prediction results. More specifically, at least some embodiments described herein generate text data from one or more frames of a video, wherein the text data is input into a machine learning model to produce a set of predictions that are based on text descriptions of the video frames in addition to spatial and temporal features of the video. Thus, the text descriptions of the video are able to provide further context to the machine learning model that visual techniques may lack to detect due to video complexities. Furthermore, compensating the effects of noise (e.g., visual artifacts, irrelevant background elements) within a video by including text descriptions of the video frames to generate the set of predictions enhances a machine learning model's ability to accurately align video data sequentially. Thus, the machine learning model is further enabled to provide more accurate predictions regarding agents depicted in the video. Moreover, one or more embodiments described herein comprise logical units that enable a behavior recognition and prediction model to directly generate a set of predictions from video recognition.

Various embodiments of the present disclosure can be implemented to achieve advancement in artificial intelligence recognition of behavior captured in video. Embodiments described herein include systems, computer-implemented methods, and computer program products that facilitate video behavior recognition and prediction based on a generative language model.

In some embodiments, a video is input to the first machine learning model to produce text data, where the first machine learning model comprises a generative language model. In various aspects the text data is input into a second machine learning model to produce a first set of predictions regarding one or more agents depicted in the video. The first set of predictions is then input into an embedding layer to generate embeddings of the first set of predictions. Therefore, the embeddings and video are input into the third machine learning model to produce a second set of predictions regarding the one or more agents, where the third machine learning model can comprise a behavior recognition model. The third machine learning model generates the second set of behavior predictions based on spatial features, temporal features, and semantic features contained by the embeddings. Integration of the semantic features can reduce or avoid the effects of video complexities on behavior recognition and prediction because the semantic features do not reply upon visual techniques that can err due to visual noise (e.g., visual artifacts, drastic lighting changes) in analyzed video frames. Furthermore, image frames of videos contain vast semantic information that can be utilized to improve prediction accuracy. Moreover, the embodiments described herein enable direct predictions from recognition results.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 101 as illustrated at FIG. 1, and/or systems thereof, can further comprise, be associated with and/or be coupled to one or more computer and/or computing-based elements described herein with reference to an operating environment, such as the operating environment 1000 illustrated at FIG. 10. For example, system 101 is associated with, such as accessible via, a computing environment 1000 described below with reference to FIG. 10, such that aspects of processing can be distributed between system 101 and the computing environment 1000. In one or more described embodiments, computer and/or computing-based elements can be used in connection with implementing one or more of the systems, devices, components and/or computer-implemented operations shown and/or described in connection with FIG. 1 and/or with other figures described herein.

FIG. 1 illustrates a block diagram of an example, non-limiting system 101 that facilitates video behavior recognition and prediction based on a generative language model in accordance with one or more embodiments described herein. System 101 comprises processor 102, memory 104, system bus 106, segmentation component 110, conversion component 112, prediction component 114, embedding component 116, and/or integration component 118. In at least some embodiments, the segmentation component 110, the conversion component 112, the prediction component 114, the embedding component 116, and/or the integration component 118 are part of the artificial intelligence video analysis enhancement code 1045 in the computer 1001 that is part of the computing environment 1000.

The system 101 and/or the components of the system 101 is/are employed to use hardware and/or software to solve problems that are highly technical in nature (e.g., related to video behavior recognition, video behavior prediction, etc.), that are not abstract and that cannot be performed as a set of mental acts by a human. Further, some of the processes performed may be performed by specialized computers for carrying out defined tasks related to video behavior recognition and prediction via generative language models. The system 101 and/or components of the system can be employed to solve new problems that arise through advancements in technologies mentioned above, computer architecture, and/or the like. The system 101 provides technical improvements to behavior recognition and prediction systems by avoiding or reducing effects of video complexities in behavior prediction, providing direct behavior prediction according to behavior recognitions, and/or improving accuracy of video behavior prediction with integration of semantic information, etc.

Discussion turns briefly to processor 102, memory 104 and bus 106 of system 101. For example, in one or more embodiments, the system 101 includes a processor 102 (e.g., computer processing unit, microprocessor, classical processor, and/or like processor). In one or more embodiments, a component associated with system 101, as described herein with or without reference to the one or more figures of the one or more embodiments, comprise one or more computer and/or machine readable, writable and/or executable components and/or instructions that are executed by processor 102 to enable performance of one or more processes defined by such component(s) and/or instruction(s).

In one or more embodiments, system 101 includes a computer-readable memory (e.g., memory 104) operably connected to the processor 102. Memory 104 stores computer-executable instructions that, upon execution by processor 102, causes processor 102 and/or one or more other components of system 101 (e.g., segmentation component 110, conversion component 112, prediction component 114, embedding component 116, and/or integration component 118) to perform one or more actions. In one or more embodiments, memory 104 stores computer-executable components (e.g., segmentation component 110, conversion component 112, prediction component 114, embedding component 116, and/or integration component 118).

System 101 and/or a component thereof as described herein, is communicatively, electrically, operatively, optically and/or otherwise coupled to one another via bus 106. Bus 106 comprises one or more of a memory bus, memory controller, peripheral bus, external bus, local bus, and/or another type of bus that can employ one or more bus architectures. One or more of these examples of bus 106 are employed. In one or more embodiments, system 101 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of system 101 can reside in the cloud, and/or can reside locally in a local computing environment (e.g., at a specified location(s)). In addition to the processor 102 and/or memory 104 described above, system 101 comprises one or more computer and/or machine readable, writable and/or executable components and/or instructions that, when executed by processor 102, enables performance of one or more operations defined by such component(s) and/or instruction(s).

In an embodiment, the segmentation component 110 receives input video 108. In various aspects, the segmentation component 110 processes digital video data (e.g., input video 108) to partition the continuous video stream into a sequence of discrete frames. The segmentation component 110 employs any suitable frame extraction techniques (e.g., uniform frame sampling, keyframe extraction, motion-based frame extraction) or video processing software to extract frames from the input video 108. Additionally, configurable parameters such as frame rate, resolution, and compression settings can be adjusted to optimize or control frame extraction of input video 108. In various aspects, the segmentation component 110 processes video data in any suitable format, including but not limited to standard video formats (e.g., MPEG-4, H.264, or AVI). Furthermore, the segmentation component 110 is configured to handle a variety of video resolutions, bit depths, and compression schemes. The resulting frames extracted by the segmentation component 110 are encoded in any appropriate format, such as JPEG, PNG, BMP, or any other suitable image formats. In some embodiments, the segmentation component 110 is configured to provide control of a desired frame rate or range of frame rates. Parameters, such as temporal analysis thresholds or frame skip intervals, can be adjusted to control the density of frames generated. The resulting frames, regardless of the frame rate chosen, are encoded in any suitable image format. No matter the frame rate, image format, or other parameters chosen, the segmentation component 110 generates a set of frames in the form of images from the input video 108.

In various aspects, the conversion component 112 inputs the input video 108 (e.g., frames thereof produced via the segmentation component 110) to the first machine learning model to produce text data that describes the video. More specifically, the first machine learning model receives the set of frames generated by execution of the segmentation component 110 on input video 108 and generates image captions for one or more frames of the generated set of frames. For example, if the input video 108 displays a toddler by a pool, the first machine learning model can generate captions for each frame of the input video 108 (e.g., frame 1 depicts a toddler walking outside and the parents are turned away from the pool, frame 2 depicts the toddler running towards the pool, frame 3 depicts the toddler is by the edge of the pool). In at least some embodiments, the first machine learning model comprises a generative language model to facilitate conversion of the set of frames to text data. The generative language model receives the set of frames as input and generates text data per frame (e.g., image captions of one or more frames of input video 108) as output. A generative language model is a machine learning model that has the ability to generate new text based on its training and in response to some input data that it receives.

In an embodiment, the conversion component 112 electronically stores, electronically maintains, electronically controls, or otherwise electronically accesses the first machine learning model, implemented as a deep learning neural network. In various aspects, the first machine learning model can have or otherwise exhibit any suitable internal architecture. For instance, the first machine learning model can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

No matter the internal architecture of the first machine learning model, the first machine learning model is configured to generate text data (e.g., image captions, frame descriptions) based on inputted frames of the input video 108.

In various instances, the conversion component 112, in various aspects, executes the first machine learning model on the set of frames. Such execution causes the first machine learning model to generate image captions or descriptions of one or more frames of the set of frames. More specifically, the conversion component 112 feeds the set of frames to an input layer of the first machine learning model. In various instances, the set of frames completes a forward pass through one or more hidden layers of the first machine learning model. In various cases, an output layer of the first machine learning model generates image captions or descriptions, based on activation maps or intermediate features produced by the one or more hidden layers.

Although the herein disclosure mainly describes various embodiments as implementing machine learning models as generative language models, this is a mere non-limiting example. In various aspects, the herein-described teachings can be implemented via any suitable machine learning models exhibiting any suitable artificial intelligence architectures that facilitate generating text data from an inputted set of images (e.g., CLIP-based (Contrastive Language-Image Pretraining) models).

In some embodiments, the prediction component 114 inputs the text data into the second machine learning model to produce a first set of predictions regarding one or more agents depicted in the video. More specifically, the first set of predictions are determined via execution of the second machine learning model on the text data for each frame extracted from the input video 108. In various aspects, principles of probabilistic and decision theory are used in inference to determine one or more responses based on information retained in a knowledge source database. Additionally or alternatively, the second machine learning model can comprise predictive models constructed using machine learning and/or automated learning procedures. Logic-centric inference can also be employed separately or in conjunction with probabilistic methods. For example, decision tree learning can be utilized to map observations about data retained in a knowledge source database to derive a conclusion as to a response to a question.

In various aspects, the second machine learning model can be implemented as a foundation model by pretraining the model on a large and diverse dataset to learn general patterns and representations. A foundation model is defined by the training on the large and diverse dataset (e.g., so that the foundation model contains a large number of parameters, such as tens of billions of parameters), and by its ability to be fixed with various downstream tasks. Once pretrained, the foundation model is adjusted for generating predictions (e.g., the first set of predictions regarding one or more agents depicted in the video) for specific tasks or domains (e.g., predicting traffic violations, predicting unusual behavior in public transport, predicting patient medical conditions).

In an embodiment, the embedding component 116 inputs the first set of predictions into an embedding layer of an embedding model to produce embeddings of the first set of predictions.

In various aspects, the embedding component 116 electronically stores, electronically maintains, electronically controls, or otherwise electronically accesses the embedding model. In various aspects, the embedding model can have or otherwise exhibit any suitable internal architecture. For instance, the embedding model can be a multi-layered neural network, comprising an input layer, one or more hidden layers, and an output layer. In various instances, any of such layers can be coupled together by any suitable interneuron connections or interlayer connections, such as forward connections, skip connections, or recurrent connections. Additionally, in various cases, any of such layers can be any suitable types of neural network layers having any suitable learnable or trainable internal parameters. For example, any of such layers can have learnable or trainable parameters. As another example, any of such layers can be dense layers, whose learnable or trainable parameters can be weight matrices or bias values. As still another example, any of such layers can be batch normalization layers, whose learnable or trainable parameters can be shift factors or scale factors. Further still, in various cases, any of such layers can be any suitable types of neural network layers having any suitable fixed or non-trainable internal parameters. Moreover, the embedding model can be initialized with pre-trained embeddings, enabling it to capture intricate semantic relationships between words and phrases. As another example, the embedding model can employ advanced natural language processing techniques, such as contextual embeddings and transformer-based architectures.

No matter the internal architecture of the embedding model, the embedding model is configured to generate embeddings from the first set of predictions via an embedding layer. The embedding model includes one or more layers which generate embeddings but does not need or have output classification layers which classify the embeddings.

In various instances, execution of the embedding model on the first set of predictions causes the embedding model to generate embeddings. More specifically, the first set of predictions are fed to an input layer of the embedding model. In various instances, the set of predictions completes a forward pass through one or more hidden layers of the embedding model. In various cases, an output layer of the embedding model generates embeddings, based on activation maps or intermediate features produced by the one or more hidden layers. In various aspects, the embedding model that is used has already been trained, wherein input data is encoded into numerical representations (e.g., one-hot encoding, sub-word embeddings) that are utilized to update the embedding model's parameters through backpropagation. Thus, the embedding model is enabled to learn contextual relationships and semantic information. The model also leverages pre-trained embeddings for initialization, benefiting from existing linguistic knowledge.

In various aspects, the embedding model processes the first set of predictions, wherein the first set of predictions are organized as a corpus. Each prediction of the first set of predictions undergoes tokenization, wherein the predictions are broken down into individual words or sub-word units. In various aspects, the tokenized prediction input is fed into an embedding layer of the embedding model. The embedding model then produces a set of embeddings represented as vectors of fixed dimensions, wherein the vectors contain semantic meaning of words within the given linguistic context. In other words, the vectors generated by the embedding model represent embeddings in a continuous vector space, encapsulating semantic information and contextual relationships, wherein each word of the first set of predictions is mapped to a fixed-dimensional vector. In various aspects, the vector dimensions are determined by hyperparameters of the embedding model (e.g., 50 dimensions, 300 dimensions). The numerical values within each vector are real numbers, wherein the magnitudes and directions encode information about the word's meaning and its relationships with other words in the corpus. Such values are learned during a training process. During a use stage of a trained embedding model, the model adjusts its parameters based on the contextual information and semantic relationships present in the inputted first set of behavioral predictions.

In some embodiments, the integration component 118 inputs the embeddings and the input video 108 into the third machine learning model (e.g., a behavior recognition model) to produce a second set of predictions regarding the one or more agents based on spatial features, temporal features, and/or semantic features. In other words, the embeddings are utilized as semantic features in parallel with spatial features and/or temporal features determined by the third machine learning model on input video 108 to generate the second set of predictions. The second set of predictions provides refined or more accurate predictions, as the second set of predictions are not only based upon spatial and temporal information of the input video 108, but semantic information as well. Therefore, integration of the semantic features enables prediction based upon features that are not affected by video noise or complexities (e.g., camera movement, drastic lighting changes, etc.). For example, and as described herein, the embeddings are integrated as semantic features into a temporal spatial network, however, the embeddings can be integrated as semantic features into any other suitable behavior recognition or prediction models as well to provide refined behavior predictions of input video 108.

In at least some embodiments, the first machine learning model and the third machine learning model can be sub-models of one unified model or framework. In other words, the first set of predictions and the second set of predictions are generated from the same model, wherein the unified model engages the machine learning sub-model (e.g., the first machine learning model) to generate the first set of predictions, and wherein the action recognition sub-model (e.g., the third machine learning model) integrates the first set of predictions to generate the second set of predictions.

Figure 2:
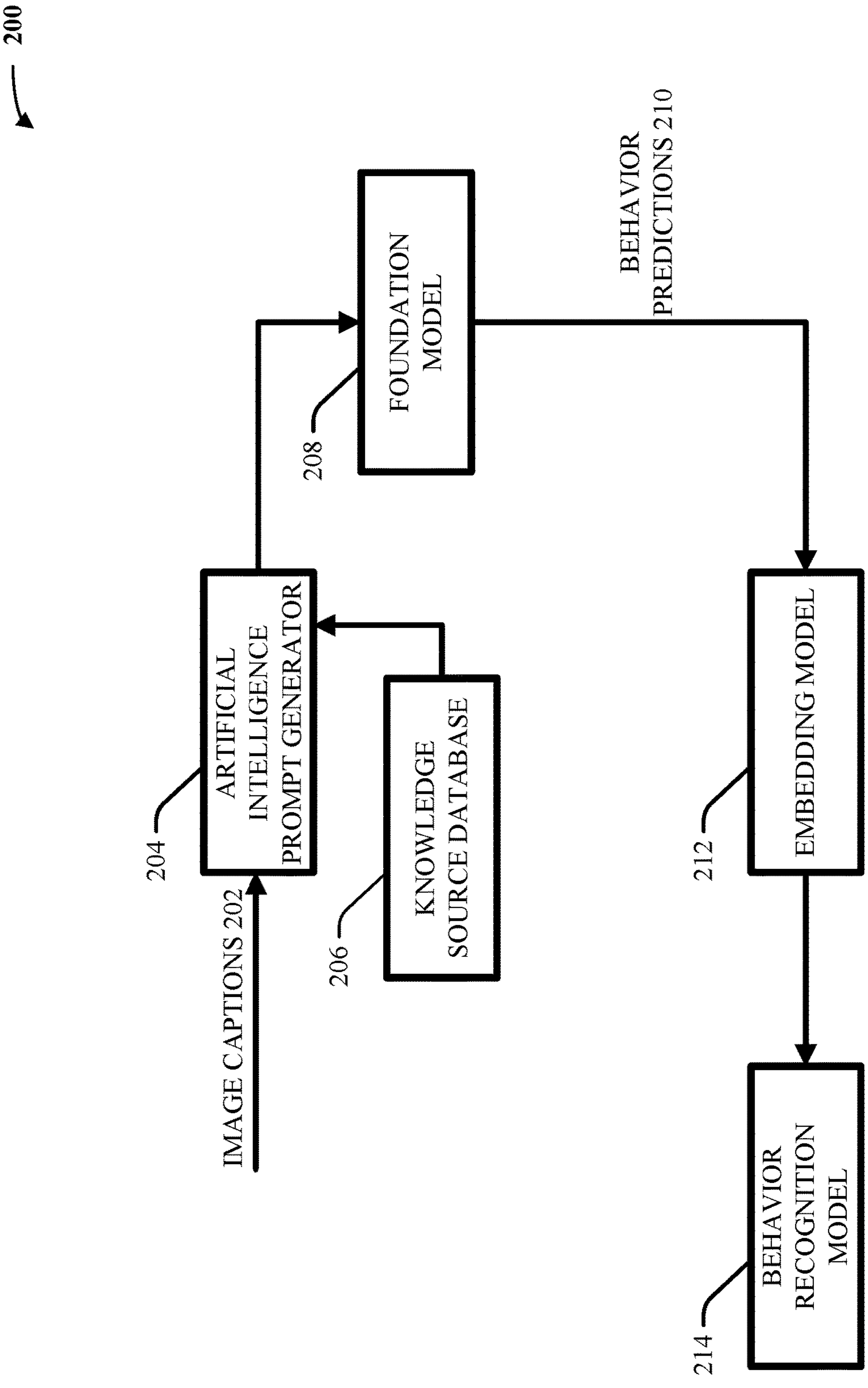
FIG. 2 illustrates a pipeline for facilitating video behavior recognition and prediction based on a generative language model, in accordance with one or more embodiments described herein.

FIG. 2 illustrates a pipeline for generating video behavior recognition and prediction based on a generative language model, in accordance with one or more embodiments described herein.

Figure 3:
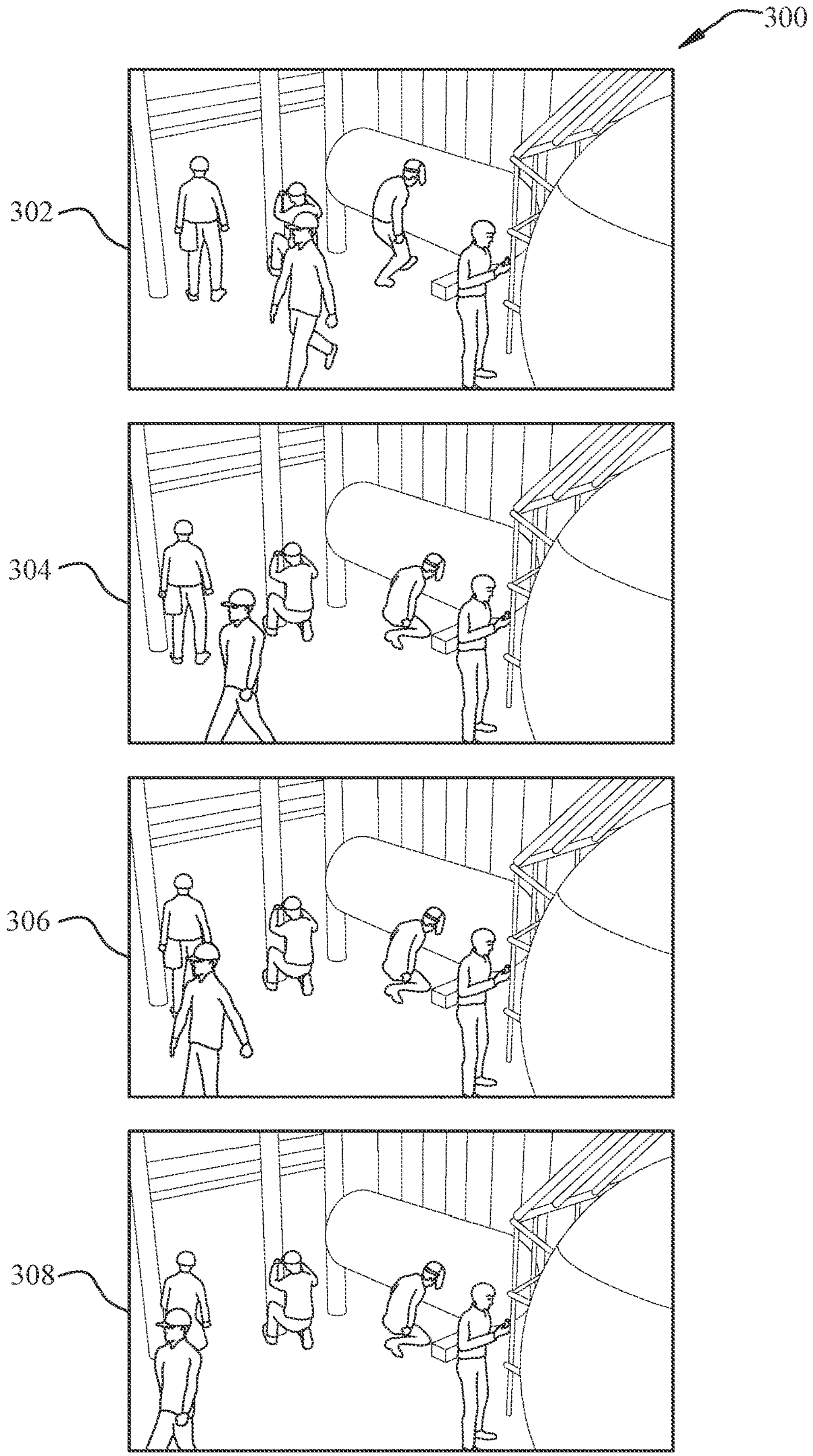
FIG. 3 depicts a set of frames extracted from an input video, in accordance with one or more embodiments described herein.

In some embodiments, the segmentation component 110 extracts frames from input video 108. An example set of frames depicted from an input video are depicted by FIG. 3. In some embodiments, the first machine learning model generates image captions 202 for frame 302, frame 304, frame 306, and frame 308. For example, the first machine learning model generates the following image caption for frame 308: "Several workers were repairing equipment in a factory, one of them was looking down to repair a running machine, and two workers were repairing other parts".

In an embodiment, the fourth machine learning model reformulates the text data generated by the first machine learning model into a format (e.g., prompt) that can be processed by the second machine learning model (e.g., a foundation model 208). In various aspects, the fourth machine learning model (e.g., an artificial intelligence prompt generator 204) reformulates the image caption 202 of frame 308 into a prompt that is formatted into a template that can be processed by foundation model 208. The fourth machine learning model receives the image caption 202 as input data and, in response, produces a prompt that is a reformulation of the image caption 202. More specifically, the fourth machine learning model restructures the image caption into a uniform format that clearly states the task intent and desired output of the task. For example, the fourth machine learning model reformulates the image caption into the following prompt: "Predict the activity and focus of individual workers in a factory where several workers are repairing equipment. Describe the specific actions of a worker looking down to repair a running machine and the activities of two workers repairing other parts".

The fourth machine learning model performs prompt engineering to improve the capacity of the second machine learning model on a range of common and complex tasks such as question answering and arithmetic reasoning. In various aspects, the prompt can be a query (e.g., "What are the symptoms of a cold?"), a command (e.g., "Write a diagnosis for this patient's symptoms.", a short statement of feedback (e.g., "too verbose", "too formal", "rephrase", "omit this word"), or a longer statement including context, instructions, and input data. Prompt engineering may involve phrasing a query, specifying a style, or providing relevant context. In any case, execution of the fourth machine learning model on the text data enables the second machine learning model to generate the first set of predictions regarding the one or more agents depicted in input video 108 by providing a processable format that clearly specifies a task and the desired output.

In at least some embodiments, the fourth machine learning model employs knowledge source databases 206 to construct a knowledge base that provides further information in the generated prompt. Therefore, the generated prompt contains further information that assists the foundation model 208 (e.g., the second machine learning model) to generate the first set of predictions regarding the one or more agents (e.g., the workers, factory equipment, robots, etc.) depicted in the input video 108 with further accuracy. As an example, the knowledge source databases 206 can comprise local data lakes, playbooks (e.g., playbooks of machine operations for safety operation workshops), and/or business analysis knowledge. Furthermore, the types of source files comprised in the knowledge source databases 206 can include but are not limited to PDF, DOC, TXT, and PNG.

In various aspects, the reformulated image caption is fed as input into the foundation model 208 to generate a set of behavior predictions 210 for frame 308 and a confidence level for each of the behavior predictions 210 generated (e.g., a respective confidence level for at least one of the first set of predictions). In at least some embodiments, the input here into the foundation model 208 includes text data in some form without any video or images. The video or images are used subsequently as part of input into the behavior recognition model 214. In one example, the foundation model generates the following behavior predictions 210 with corresponding confidence levels: (i) The worker who bent his head to repair the machine will get caught in the running machine with 0.7 confidence or (ii) The worker on the left will stop his work and stand up immediately to help the worker with 0.25 confidence. In various cases, the foundation model 208 generates any number of behavior predictions 210.

In some embodiments, an embedding model 212 receives as input the behavior predictions 210 generated by foundation model 208. The embedding model 212 generates embeddings of the behavior predictions 210, wherein the embeddings are integrated into the behavior recognition model 214 as semantic features. Therefore, the behavior recognition model 214 can generate refined behavior predictions (e.g., second set of predictions) and confidence levels of the one or more agents depicted in the input video 108 because the predictions are formulated upon spatial, temporal, and semantic features. For example, the behavior recognition model 214 outputs the following refined behavior predictions and confidence levels: (i) The worker who bent his head to repair the machine will get caught in the running machine and hurt himself with 0.8 confidence or (ii) The worker on the left will stop his manual work and stand up immediately to help the worker with 0.77 confidence. The behavior recognition model 214 receives video (or images from video) along with the first set of predictions (as text) as input which causes the behavior recognition model 214 to produce the second set of predictions.

In some embodiments, the third machine learning model (e.g., behavior recognition model 214) weights the embeddings (e.g., semantic features) against at least one of the spatial features or the temporal features generated via inputting the video into the third machine learning model (e.g., behavior recognition model 214). More specifically, a spatial consensus (e.g., agreement or alignment among spatial representations of involved entities across video frames), temporal consensus (e.g., alignment or consistency over time in predictions made by the behavior recognition model regarding a sequence of actions), and feature fusion are generated by the behavior recognition model 214, wherein the feature fusion is weighted against the spatial or temporal consensus in class score fusion (e.g., process of combining scores or predictions generated by multiple classifiers or models for the purpose of making a final decision or prediction) to generate the second set of predictions. In various aspects, the feature fusion comprises a consensus among embeddings of the first set of predictions generated for each frame or subset of frames of input video 108. In other words, feature fusion can be described as the agreement of semantic representations of involved entities across frames of input video 108. As an example of weighting the feature fusion for embeddings, the feature fusion can be assigned a higher weight or lower weight than the spatial or temporal consensus in class score fusion of the behavior recognition model.

Figure 4:
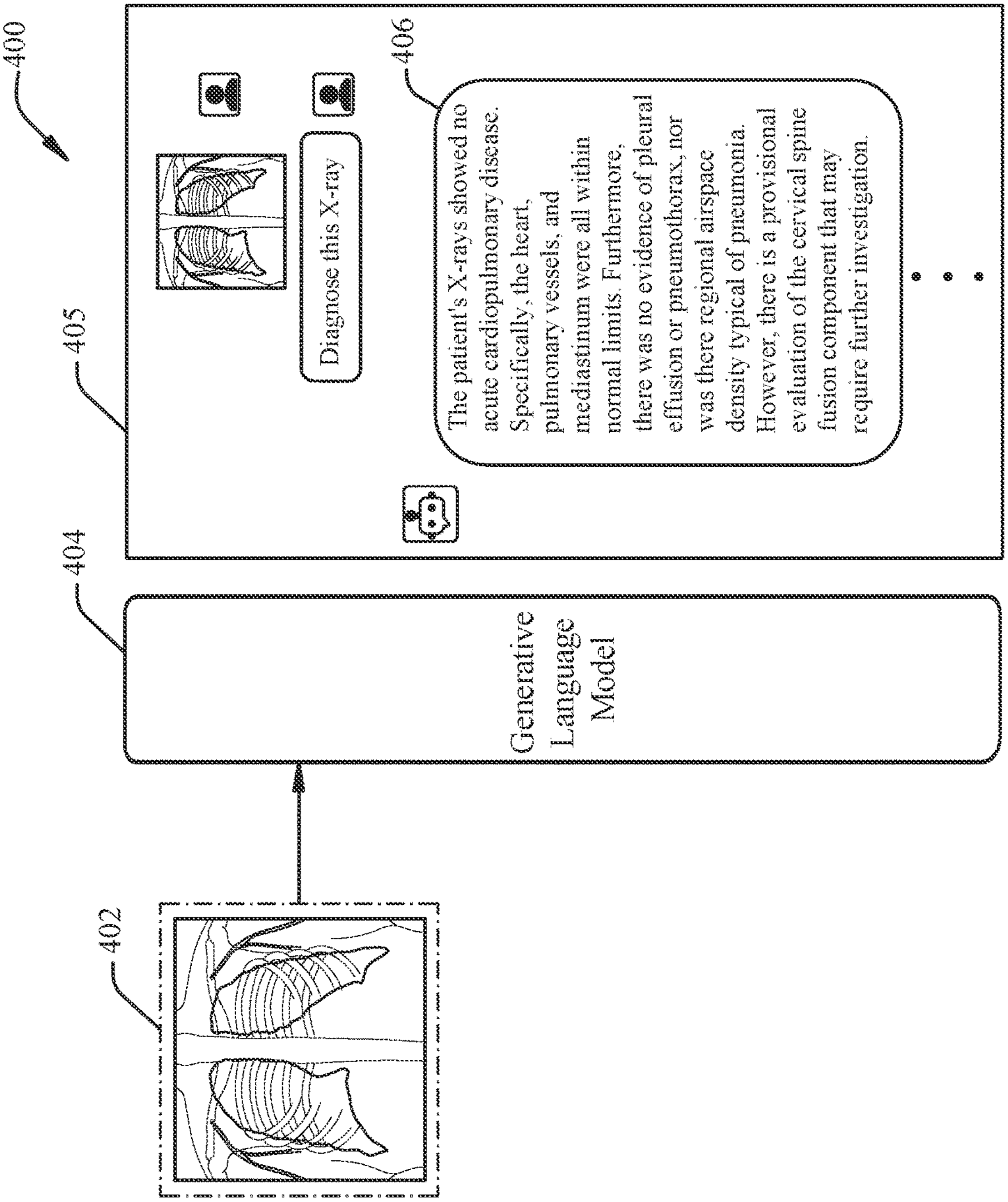
FIG. 4 illustrates a generative language model generating text data from an input image, in accordance with one or more embodiments described herein.

FIG. 4 illustrates a generative language model generating text data from an input image, in accordance with one or more embodiments described herein.

In at least some embodiments, the first machine learning model comprises any suitable generative language model comprising any suitable architecture to generate text data from the extracted frames of the input video 108. For example, image 402 depicts a chest x-ray. The generative language model 404 receives image 402 to produce a description (e.g., textual image content 406) of image 402, and is depicted on an example visually rendered interface 405 of the generative language model 404. As described with reference to FIG. 1, any other suitable networks or models may be used to generate image captioning of extracted frames from input video 108 (e.g., VisualGLM, CLIP-based models).

Figure 5:
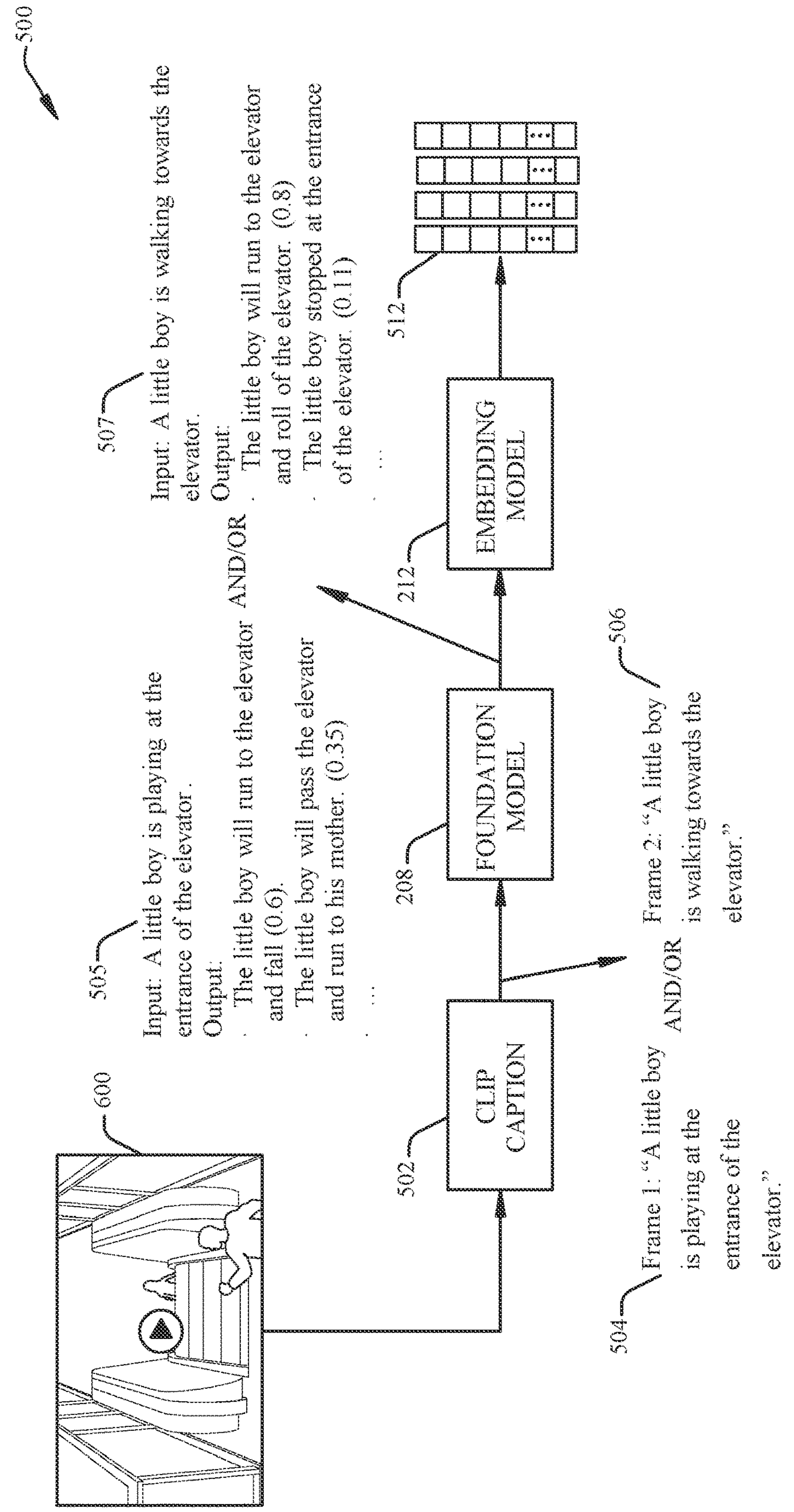
FIG. 5 illustrates a pipeline for generating embeddings, in accordance with one or more embodiments described herein.

FIG. 5 illustrates a pipeline for generating embeddings, in accordance with one or more embodiments described herein.

Figure 6:
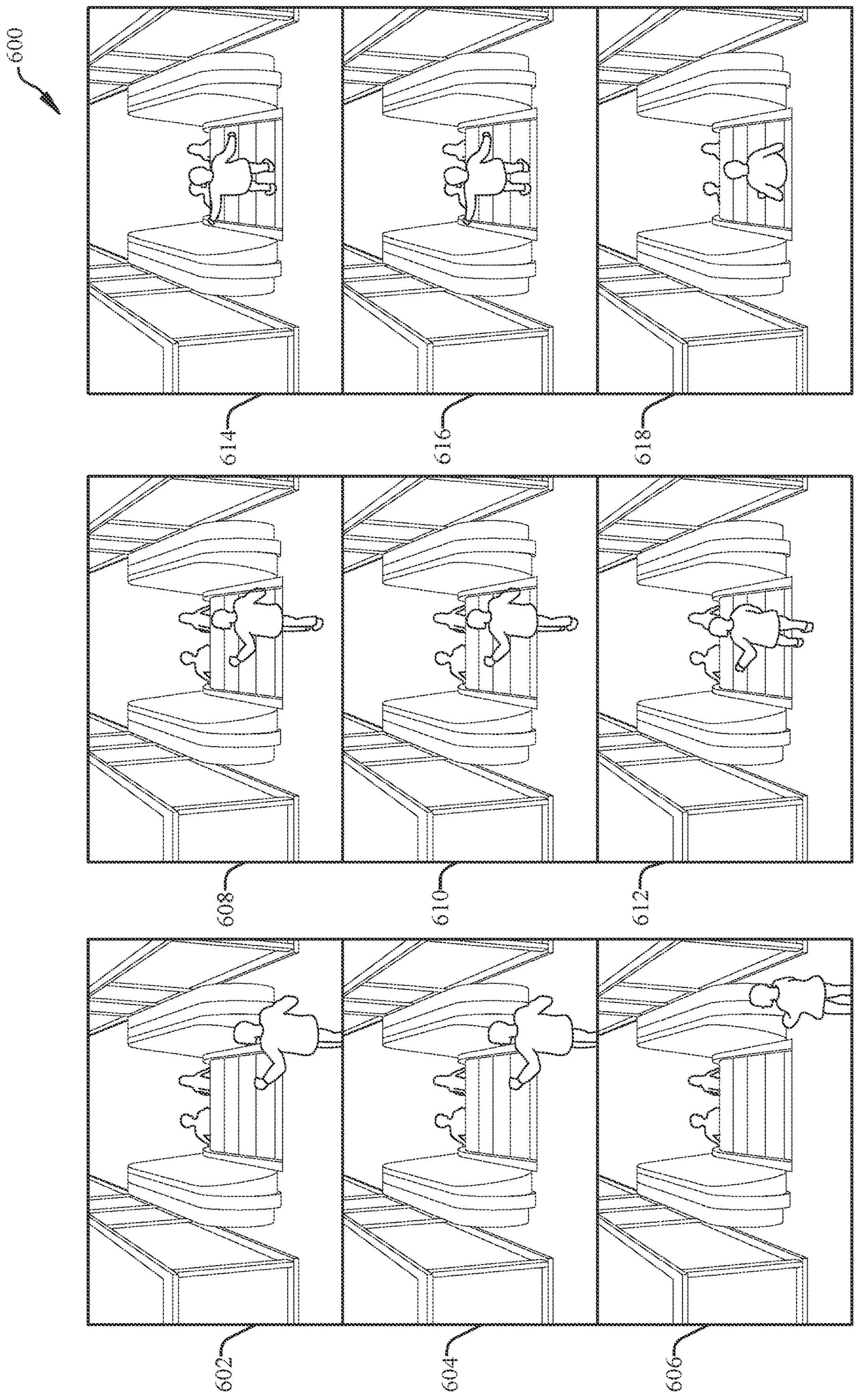
FIG. 6 depicts a set of frames extracted from an input video, in accordance with one or more embodiments described herein.

As shown in FIG. 5, CLIP caption 502, for example, is executed on an input video 600 to extract a set of frames and generate text data that describes the input video 600. The extracted frames of input video 600 (e.g., frame 602, frame 604, frame 606, frame 608, frame 610, frame 612, frame 614, frame 616, and frame 618) are depicted in FIG. 6. CLIP caption 502 generates the text data for one or more of the extracted frames (e.g., a subset of the extracted frames, all of the extracted frames). For example, CLIP caption 502 generates caption 504 of frame 602 and/or caption 506 of frame 604. Thus, CLIP caption 502 is an example of a first machine learning model with respect to the terminology of this disclosure. Foundation model 208 (which is an example of a second machine learning model with respect to terminology of this disclosure) receives caption 504 and/or caption 506 as input and generates behavior predictions 505 and/or behavior predictions 507 as output. Behavior predictions 505 correspond to caption 504 of frame 602 and behavior predictions 507 correspond to caption 506 of frame 604. That is, the foundation model 208 receives caption 504 and generates corresponding behavior predictions 505. Separately, the foundation model 208 receives caption 506 and generates corresponding behavior predictions 507. Therefore, the foundation model 208 outputs a set of behavior predictions comprising behavior predictions 505, behavior predictions 507, and behavior predictions of the remaining extracted frames. Alternatively, depending on the input of captions from extracted frames, the foundation model 208 outputs behavior predictions 505, behavior predictions 507, or behavior predictions of the remaining extracted frames individually (e.g., only outputs behavior predictions 507 if only caption 506 is input). Furthermore, behavior predictions 505, behavior predictions 507, and behavior predictions of the remaining extracted frames comprise confidence levels for each prediction in some embodiments. The embedding model 212 receives behavior predictions 505 and behavior predictions 507, including the determined confidence levels, as input and generates embeddings 512 in the form of vectors of a fixed length.

Figure 7:
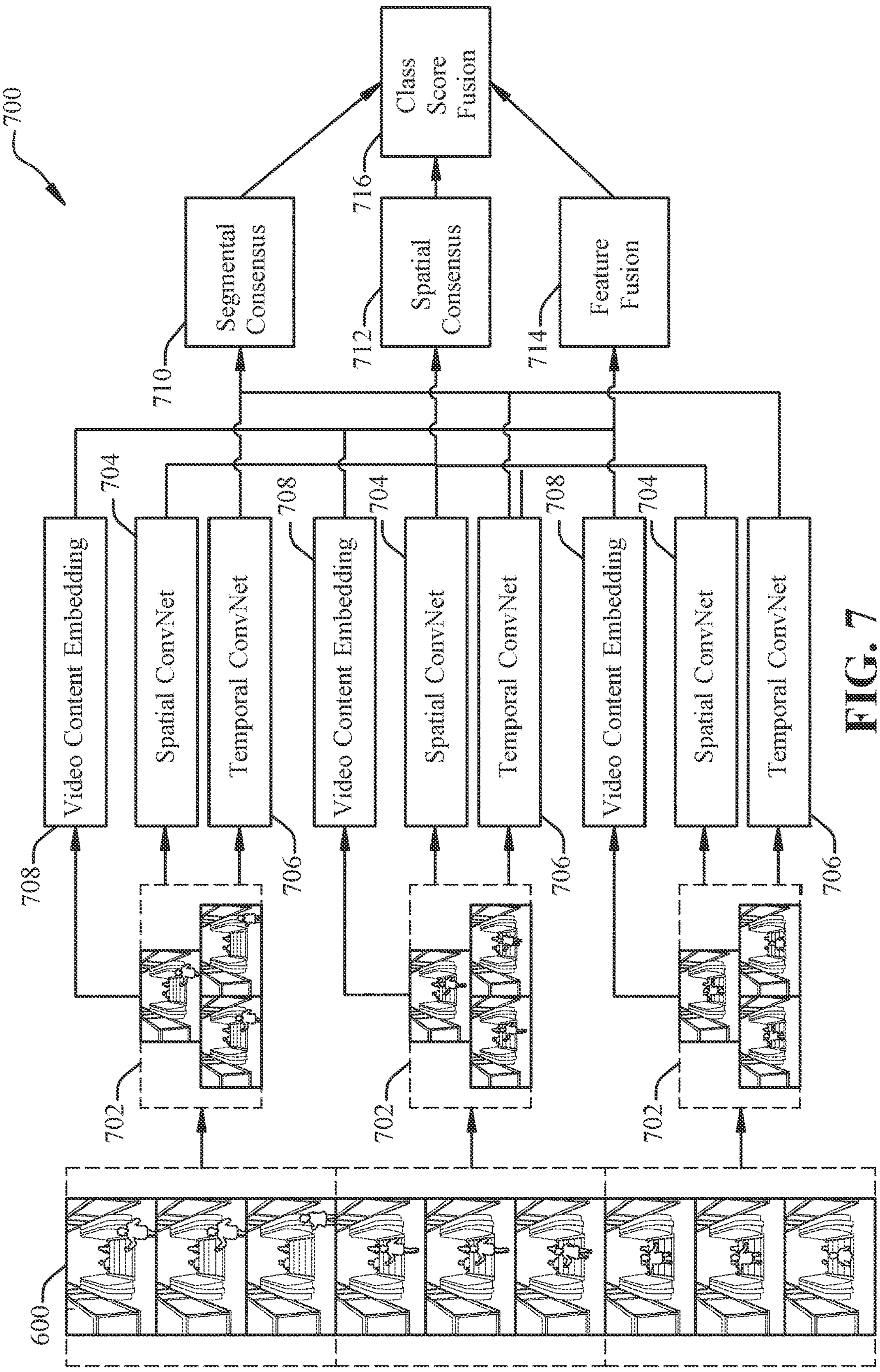
FIG. 7 illustrates integration of semantic features into a behavior recognition model, in accordance with one or more embodiments described herein.

FIG. 7 illustrates integration of semantic features into a behavior recognition model, in accordance with one or more embodiments described herein.

In some embodiments, the embeddings are input as semantic features in the third machine learning model. For example, and as depicted in FIG. 7, the semantic features are integrated into a temporal spatial network. More specifically, subsets of extracted frames 702 (e.g., one subset of the subset of extracted frames 702 comprises frame 614, frame 616, and frame 618) from input video 600 comprise spatial features 704, temporal features 706, and semantic features 708. The spatial features 704 and temporal features 706 are determined through conventional methods of the temporal spatial network (e.g., by analyzing the video frame inputs that are input into this behavior recognition model). In various aspects, the semantic features 708 are generated by creating embeddings of the first set of predictions (e.g., generated via execution of the foundation model on the text data of the input video 108) in vector form. In some embodiments, a segmental/temporal consensus 710, spatial consensus 712, and a feature fusion 714 are determined by combining the respective features for each subset of extracted frames 702. Segmental/temporal features taken from some or all of the various sets of input frames are combined to form the segmental/temporal consensus 710. Spatial features taken from some or all of the various sets of input frames are combined to form the spatial consensus 712. The various embeddings are fused together as a feature fusion 714. The segmental/temporal consensus 710, spatial consensus 712, and the feature fusion 714 are combined through class score fusion 716 to generate the second set of predictions. In these modules (e.g., segmental/temporal consensus 710, spatial consensus 712, feature fusion 714), the feature vectors extracted from different images will be classified and discriminated. Multiple discriminating results and corresponding scores will be obtained. In some embodiments, weighted average scores are obtained in these modules. In class score fusion 716, under different input modes, the weighted average score obtained in the previous steps is used for a class score fusion to obtain video-level class scores. Then softmax is added to produce a final result as a second set of one or more predictions.

Furthermore, the second set of predictions are more refined than the first set of predictions and are more refined than sets of behavior predictions generated from only spatial features 704 and temporal features 706 because the integrated embeddings enable the behavior prediction model to better incorporate the vast semantic data that is obtained through video frames. In various aspects, weights are assigned to the segmental/temporal consensus 710, spatial consensus 712, and the feature fusion 714 to allow adjustable control over the second set of predictions generated. For example, the temporal spatial network with integrated semantic features generates behavior predictions of input video 600 (e.g., "The toddler will run to the escalator and roll off the escalator" with 0.8 confidence). The second set of predictions is automatically presented (e.g., via a text display of a display screen that is part of the computer 1001, via an audio playing via an audio speaker connected wired or wirelessly to the computer 1001, and/or via some other presentation via the computer 1001). In some embodiments, the second set of predictions also triggers an automated response to the prediction. In some embodiments, the second set of predictions is input into another machine learning model which receives the second set of predictions as input and, in response, generates an appropriate action. For example, with the prediction of the child rolling off/over the escalator this further machine learning model generates an action to temporarily stop the escalator via generation of a command signal that is implemented via an automated controller of the escalator. Other various automated actions are generated in other embodiments based on the corresponding system and the corresponding prediction. The computer 1001 generates and transmits a control signal to machinery, to other computers, and/or to other programs within the computer 1001 to effect automated performance of the responsive system action.

In some embodiments, the use and weighting of embeddings against spatial features and temporal features has the advantage of enabling and improving a machine learning model's ability to capture relationships between semantic, spatial, and temporal features. Doing so has further advantages in terms of improving prediction accuracy of the machine learning model.

Figure 8:
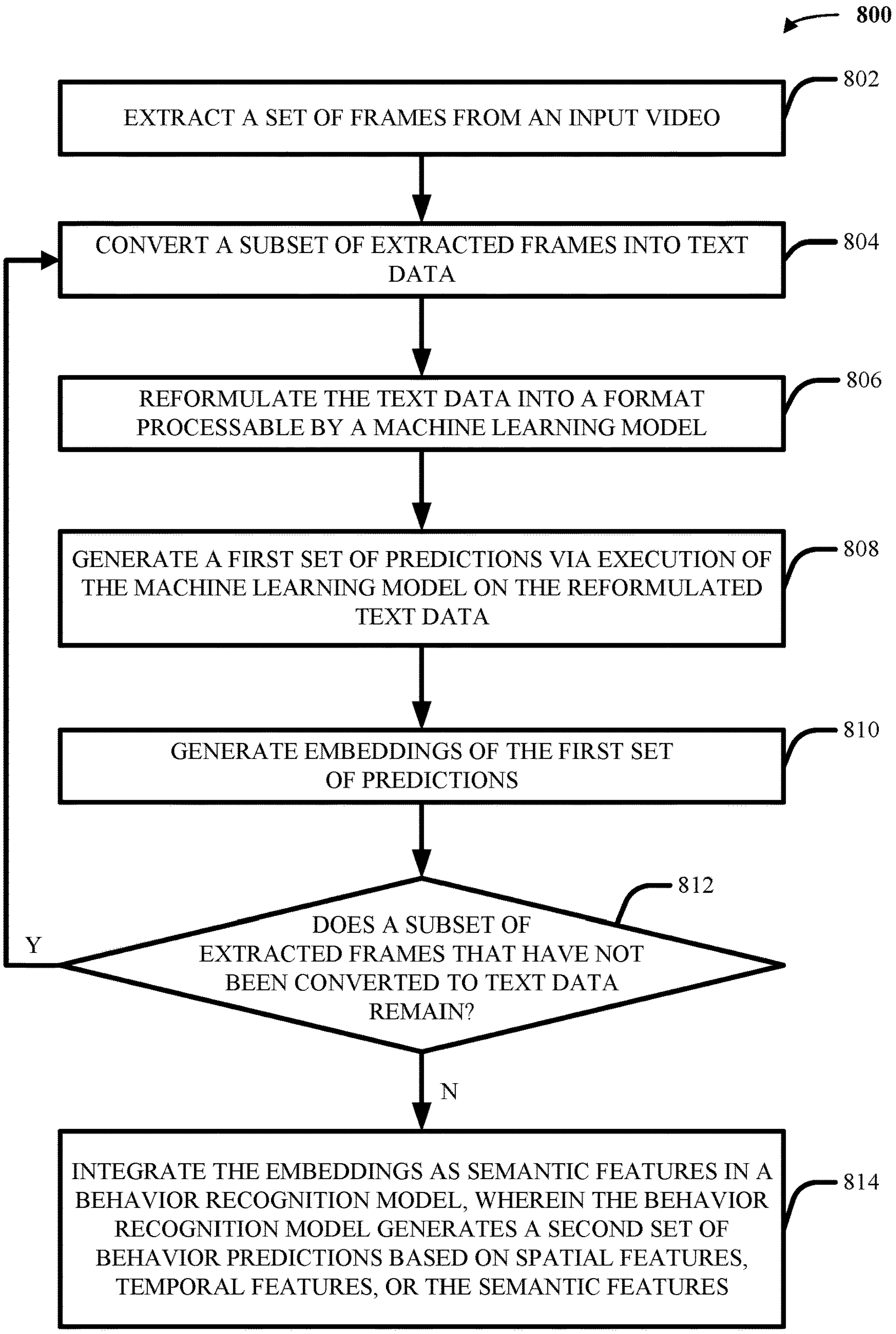
FIG. 8 illustrates a flow diagram of an example, non-limiting, computer implemented method that can facilitate video behavior recognition and prediction based on a generative language model, in accordance with one or more embodiments described herein.

FIG. 8 illustrates a flow diagram of an example, non-limiting, computer implemented method 800 that facilitates video behavior recognition and prediction based on a generative language model in accordance with one or more embodiments described herein. Repetitive description of like elements employed in other embodiments described herein is omitted for sake of brevity.

At 802, method 800 comprises extracting, by a device (e.g., segmentation component 110) operatively coupled to a processor (e.g., processor 102), a set of frames from an input video (e.g., input video 108).

At 804, method 800 comprises converting, by the device (e.g., the first machine learning model), a subset of extracted frames into text data.

At 806, method 800 comprises reformulating, by the device (e.g., the fourth machine learning model), the text data into a format processable by a machine learning model (e.g., the second machine learning model).

At 808, method 800 comprises generating, by the device (e.g., the second machine learning model), a first set of predictions via execution of the machine learning model on the reformulated text data.

At 810, method 800 comprises generating, by the device (e.g., the embedding layer), embeddings of the first set of predictions.

At 812, method 800 comprises determining if a subset of extracted frames that have not been converted to text data remain. If yes, (e.g., a subset of extracted frames that have not been converted to text data remain), method 800 can return to step 804. If no, (e.g., a subset of extracted frames that have not been converted to text data does not remain), method 800 can proceed to step 814.

At 814, method 800 comprises integrating, by the device (e.g., integration component 118), the embeddings as semantic features in a behavior recognition model (e.g., the third machine learning model), wherein the behavior recognition model generates a second set of predictions based on spatial features, temporal features, and/or the semantic features.

Figure 9:
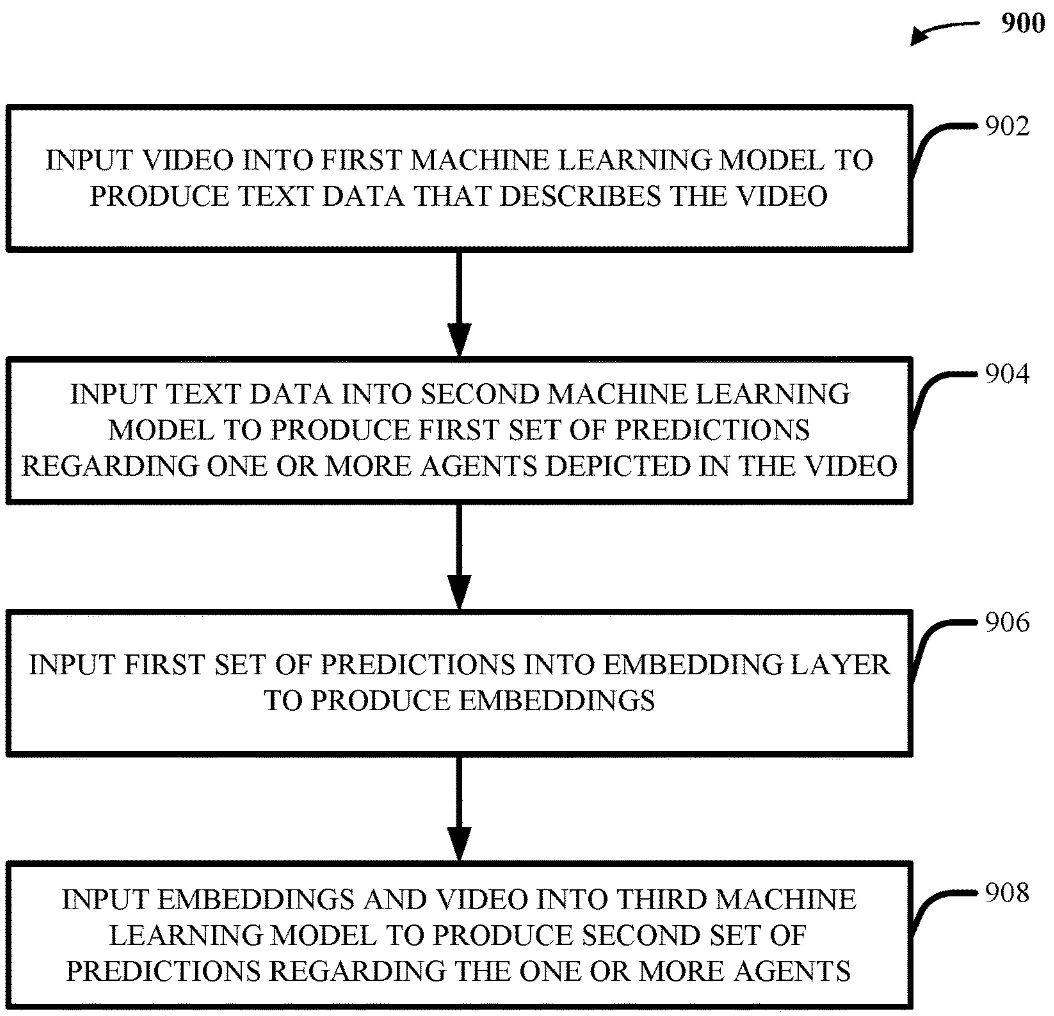
FIG. 9 illustrates a flow diagram of an example, non-limiting, computer implemented method that can facilitate video behavior recognition and prediction based on a generative language model, in accordance with one or more embodiments described herein.

FIG. 9 illustrates a flow diagram of an example, non-limiting, computer implemented method 900 that facilitates video behavior recognition and prediction based on a generative language model in accordance with one or more embodiments described herein. Repetitive description of like elements employed in other embodiments described herein is omitted for sake of brevity.

At 902, method 900 comprises inputting, by a device operatively coupled to a processor (e.g., processor 102), an input video into a first machine learning model to produce text data that describes the video.

At 904, method 900 comprises inputting, by the device, the text data into a second machine learning model to produce a first set of predictions regarding one or more agents depicted in the video.

At 906, method 900 comprises inputting, by the device, the first set of predictions into an embedding layer to produce embeddings.

At 908, method 900 comprises inputting, by the device, the embeddings and the video into the third machine learning model to produce a second set of embeddings.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components interact with one or more other components not specifically described herein for the sake of brevity, but known by those of skill in the art.

One or more embodiments described herein employ hardware and/or software to solve problems that are highly technical, that are not abstract, and that cannot be performed as a set of mental acts by a human. For example, a human, or even thousands of humans, cannot efficiently, accurately and/or effectively perform video behavior recognition and prediction based on a generative language model as the one or more embodiments described herein enable this process. And, neither can the human mind nor a human with pen and paper perform video behavior recognition and prediction based on a generative language model, as conducted by one or more embodiments described herein.

Embodiments of the present disclosure provide a number of advantages, including improving a machine learning model's accuracy of outputted predictions regarding one or more agents of a video and improving a machine learning model's ability to mitigate effects of video complexities for behavior prediction through text extraction of frames. In some embodiments, the use and weighting of embeddings to integrate semantic features into a machine learning model for behavior prediction has the advantage of enabling the machine learning model to effectively capture relationships between semantic, spatial, and temporal features of a video for enhanced prediction accuracy. Additionally, in one or more embodiments, prompt engineering text data that describes frames of a video with knowledge source databases has the advantage of providing more contextually accurate inputs into a machine learning model to produce prediction results more efficiently and accurately.

Figure 10:
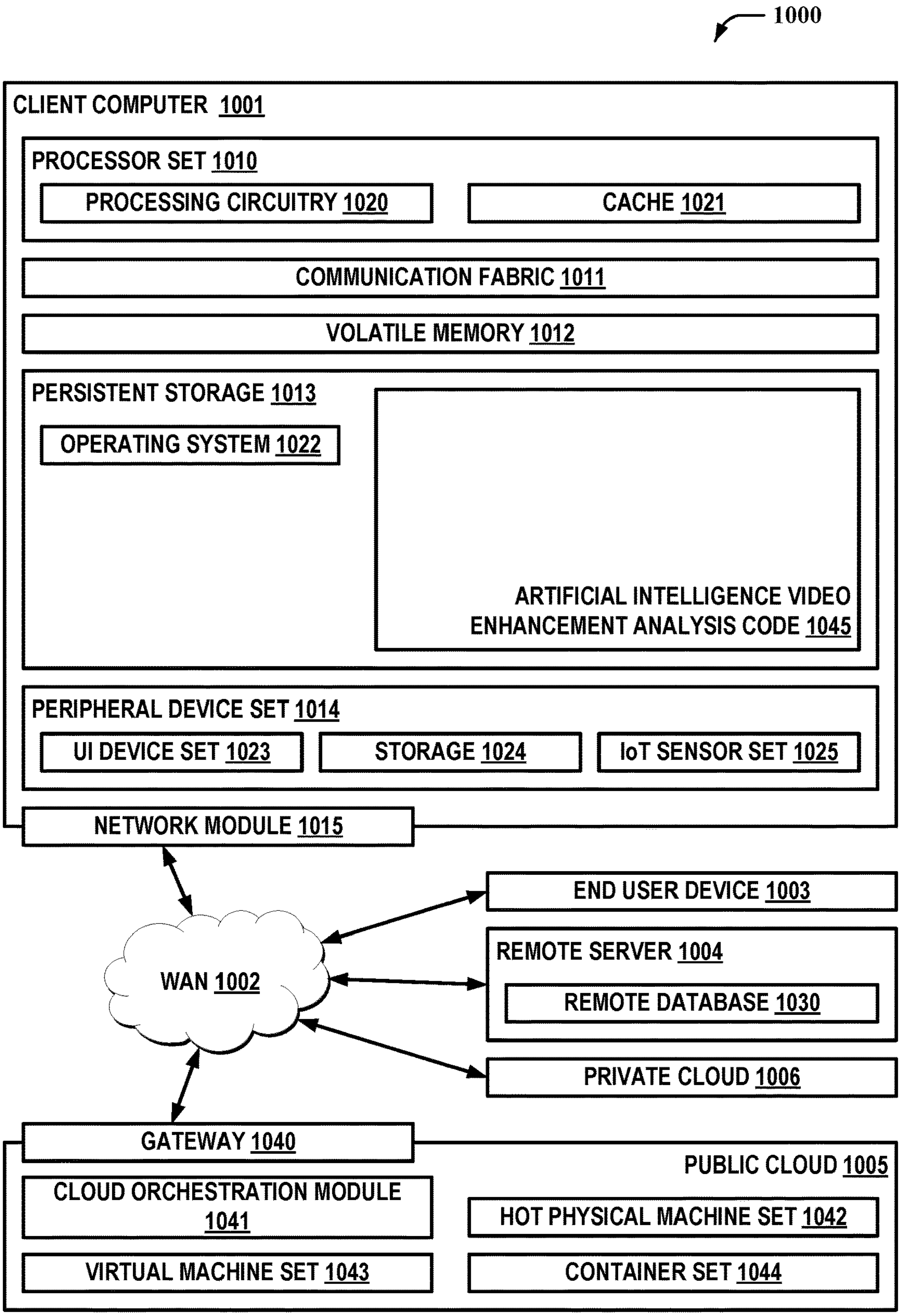
FIG. 10 illustrates a block diagram of an example, non-limiting operating environment in which one or more embodiments described herein can be facilitated.

FIG. 10 illustrates a block diagram of an example, non-limiting, operating environment in which one or more embodiments described herein are facilitated. FIG. 10 and the following discussion are intended to provide a general description of a suitable operating environment 1000 in which one or more embodiments described herein at FIGS. 1-9 can be implemented.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as artificial intelligence video analysis enhancement code 1045. In addition to block 1045, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1045, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 1030. As is well understood in the art of computer technology, and depending upon the technology, performance of a computer-implemented method can be distributed among multiple computers and/or between multiple locations. On the other hand, in this presentation of computing environment 1000, detailed discussion is focused on a single computer, specifically computer 1001, to keep the presentation as simple as possible. Computer 1001 can be located in a cloud, even though it is not shown in a cloud in FIG. 10. On the other hand, computer 1001 is not required to be in a cloud except to any extent as can be affirmatively indicated.

PROCESSOR SET 1010 includes one, or more, computer processors of any type now known or to be developed in the future. Processing circuitry 1020 can be distributed over multiple packages, for example, multiple, coordinated integrated circuit chips. Processing circuitry 1020 can implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set can be located "off chip." In some computing environments, processor set 1010 can be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods can be stored in block 1045 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory can be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 can be a read only memory (ROM), but typically at least a portion of the persistent storage allows writing of data, deletion of data and re-writing of data. Some familiar forms of persistent storage include magnetic disks and solid-state storage devices. Operating system 1022 can take several forms, such as various known proprietary operating systems or open-source Portable Operating System Interface type operating systems that employ a kernel. The code included in block 1045 typically includes at least some of the computer code involved in performing the inventive methods.

PERIPHERAL DEVICE SET 1014 includes the set of peripheral devices of computer 1001. Data communication connections between the peripheral devices and the other components of computer 1001 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 can include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 can be persistent and/or volatile. In some embodiments, storage 1024 can take the form of a quantum computing storage device for storing data in the form of qubits. In embodiments where computer 1001 is required to have a large amount of storage (for example, where computer 1001 locally stores and manages a large database) then this storage can be provided by peripheral storage devices designed for storing large amounts of data, such as a storage area network (SAN) that is shared by multiple, geographically distributed computers. IoT sensor set 1025 is made up of sensors that can be used in Internet of Things applications. For example, one sensor can be a thermometer and another sensor can be a motion detector.

NETWORK MODULE 1015 is the collection of computer software, hardware, and firmware that allows computer 1001 to communicate with other computers through WAN 1002. Network module 1015 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001) and can take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 can be a client device, such as thin client, heavy client, mainframe computer and/or desktop computer.

REMOTE SERVER 1004 is any computer system that serves at least some data and/or functionality to computer 1001. Remote server 1004 can be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data can be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs can be stored as images and can be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware and firmware allowing public cloud 1005 to communicate through WAN 1002.

The computer 1001 in some embodiments also hosts one or more machine learning models to perform the methods described herein. One or more machine learning models, in one embodiment, are stored in the persistent storage 1013 of the computer 1001. A received data sample is input to the machine learning model via an intra-computer transmission within the computer 1001, e.g., via the communication fabric 1011, to a different memory region hosting the machine learning model.

In some embodiments, one or more machine learning models are stored in computer memory of a computer positioned remotely from the computer 1001, e.g., in a remote server 1004 or in an end user device 1003. In this embodiment, the code 1045 works remotely with this machine learning model to train and use same. Training and/or inference instructions are sent via a transmission that starts from the computer 1001, passes through the WAN 1002, and ends at the destination computer that hosts the machine learning model. Thus, in some embodiments the code 1045 at the computer 1001 or another instance of the software at a central remote server performs routing of training instructions to multiple server/geographical locations in a distributed system.

In such embodiments, a remote machine learning model is configured to send its output back to the computer 1001 so that video behavior recognition and predictions generated from providing input to the trained model are provided and then presented to a user. The machine learning model(s) receive a copy of the new input data, performs machine learning analysis on the received sample, and transmits the results, e.g., predictions, back to the computer 1001.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud. The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" refer to and/or include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components reside within a process and/or thread of execution and a component can be localized on one computer and/or distributed between two or more computers. In another example, respective components execute from various computer readable media having various data structures stored thereon. The components communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A computer-implemented method comprising:

inputting, by a device operatively coupled to a processor, a video to a first machine learning model to produce text data comprising a semantic description of objects, agents, and actions depicted in the video;

inputting, by the device, the text data into a second machine learning model to produce a first set of predictions regarding one or more agents depicted in the video, wherein the first set of predictions includes at least one of roles, behaviors, or interactions associated with the one or more agents based on the semantic description;

inputting, by the device, the first set of predictions into an embedding layer to produce embeddings that encode the predicted roles, behaviors, or interactions of the one or more agents; and inputting, by the device, the embeddings and the video into a third machine learning model to produce a second set of predictions regarding the one or more agents, wherein the third machine learning model performs a feature fusion of (i) the embeddings derived from the first set of predictions and (ii) spatial and temporal features extracted from the video to generate the second set of prediction.

2. The computer-implemented method of claim 1, wherein the third machine learning model weights the embeddings against at least one of spatial features and temporal features generated via inputting the video into the third machine learning model.

3. The computer-implemented method of claim 1, wherein at least one of the first set of predictions or the second set of predictions includes a respective confidence level.

4. The computer-implemented method of claim 1, wherein the first machine learning model comprises a generative language model, the video is input into the generative language model as individual frames of the video, and the text data is generated per frame.

5. The computer-implemented method of claim 1, further comprising:

reformulating, by the device, the text data into a prompt via inputting the text data into a fourth machine learning model, and in response, receiving the prompt as output from the fourth machine learning model, wherein the text data is input as the prompt into the second machine learning model.

6. The computer-implemented method of claim 5, wherein data from a data lake is input into the fourth machine learning model so that the prompt includes supplemental information.

7. The computer-implemented method of claim 1, wherein the third machine learning model performs a feature fusion of the embeddings.

8. A computer system, comprising:

a processor set;

a set of one or more computer-readable storage media; and program instructions, collectively stored in the set of one or more computer-readable storage media, for causing the processor set to:

input a video to a first machine learning model to produce text data that describes the video, wherein the text data comprises a semantic representation of objects, agents, and actions depicted in the video;

input the text data into a second machine learning model to produce a first set of predictions regarding one or more agents depicted in the video, wherein the second machine learning model is configured to generate predictions based on the semantic representation including at least one of agent roles, behaviors, or interactions;

input the first set of predictions into an embedding layer to produce embeddings, wherein the embeddings encode relationships among the one or more agents and the predicted roles, behaviors, or interactions; and input the embeddings and the video into a third machine learning model to produce a second set of predictions regarding the one or more agents, wherein the third machine learning model is configured to (i) extract spatial and temporal features from the video, (ii) combine the extracted spatial and temporal features with the embeddings via a feature fusion operation, and (iii) generate the second set of predictions based on the combined features.

9. The computer system of claim 8, wherein the third machine learning model weights the embeddings against at least one of spatial features and temporal features generated via inputting the video into the third machine learning model.

10. The computer system of claim 8, wherein at least one of the first set of predictions or the second set of predictions includes a respective confidence level.

11. The computer system of claim 8, wherein the first machine learning model comprises a generative language model, the video is input into the generative language model as individual frames of the video, and the text data is generated per frame.

12. The computer system of claim 8, wherein the program instructions further cause the processor set to:

reformulate the text data into a prompt via inputting the text data into a fourth machine learning model and, in response, receive the prompt as output from the fourth machine learning model, wherein the text data is input as the prompt into the second machine learning model.

13. The computer system of claim 12, wherein data from a data lake is input into the fourth machine learning model so that the prompt includes supplemental information.

14. The computer system of claim 8, wherein the third machine learning model performs a feature fusion of the embeddings.

15. A computer program product comprising a non-transitory computer-readable storage medium having program instructions embodied therewith, the program instructions executable by a processor to cause the processor to:

input a video to a first machine learning model to produce text data that describes the video, wherein the text data comprises a structured, frame-associated semantic representation including objects, agents, and actions depicted in the video;

input the text data into a second machine learning model to produce a first set of predictions regarding one or more agents depicted in the video, wherein the first set of predictions is generated based on the structured semantic representation and includes at least one of predicted roles, behaviors, or interactions of the one or more agents;

input the first set of predictions into an embedding layer to produce embeddings, wherein the embeddings encode the structured semantic representation and the first set of predictions into a machine-readable latent representation; and input the embeddings and the video into a third machine learning model to produce a second set of predictions regarding the one or more agents, wherein execution of the program instructions causes the processor to fuse the embeddings with spatial and temporal features extracted from the video to generate the second set of predictions.

16. The computer program product of claim 15, wherein the third machine learning model weights the embeddings against at least one of spatial features and temporal features generated via inputting the video into the third machine learning model.

17. The computer program product of claim 15, wherein at least one of the first set of predictions or the second set of predictions includes a respective confidence level.

18. The computer program product of claim 15, wherein the first machine learning model comprises a generative language model, the video is input into the generative language model as individual frames of the video, and the text data is generated per frame.

19. The computer program product of claim 15, wherein the program instructions are further executable to cause the processor to:

reformulate the text data into a prompt via inputting the text data into a fourth machine learning model and, in response, receive the prompt as output from the fourth machine learning model, wherein the text data is input as the prompt into the second machine learning model.

20. The computer program product of claim 15, wherein the third machine learning model performs a feature fusion of the embeddings.

* * * * *